Jan. 8, 1929.
J. PETTY
1,697,881
METHOD OF WELDING TOGETHER A STEEL HEAD AND SHELL
Filed May 2, 1924
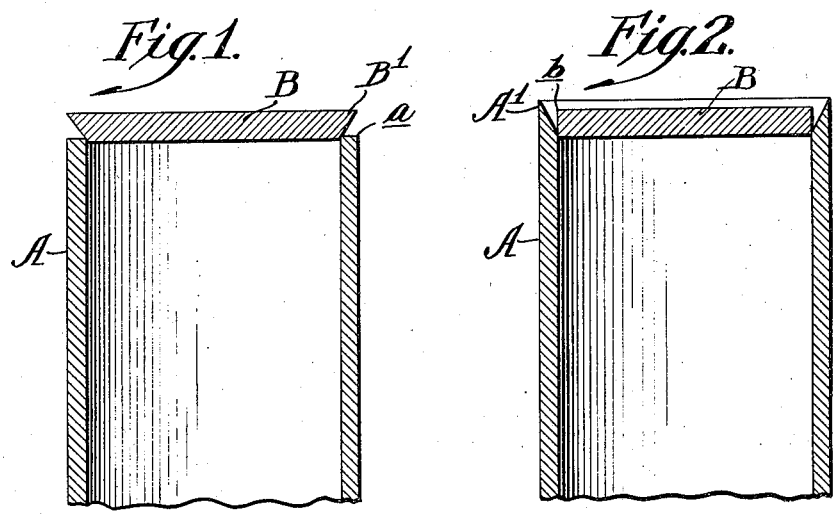
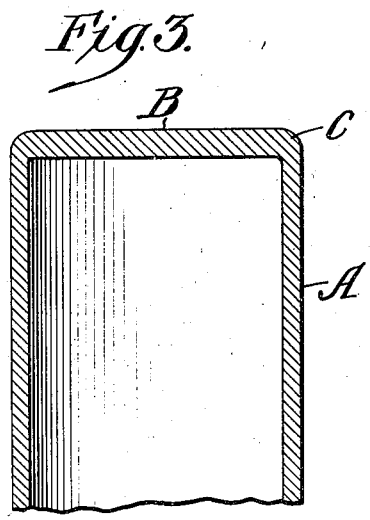
Inventor.
John Petty
by Francis Chambers
his Attorney.

Patented Jan. 8, 1929.

1,697,881

UNITED STATES PATENT OFFICE.

JOHN PETTY, OF LEBANON, PENNSYLVANIA, ASSIGNOR TO JO PET, INC., OF LEBANON, PENNSYLVANIA, A CORPORATION OF PENNSYLVANIA.

METHOD OF WELDING TOGETHER A STEEL HEAD AND SHELL.

Application filed May 2, 1924. Serial No. 710,579.

My invention relates to the welding together of a boiler head and shell, my object being to provide an improved method of uniting such parts by a forge or wrought weld.

My invention consists in forming one of the plates with a bevelled edge, placing it in contact with the other plate in such manner that its bevelled edge will overhang without contacting with the portion of the second plate to which it is to be welded, then heating the bevelled edge of the one plate and the underlying portion of the other plate to a welding heat and finally forge welding the heated parts together.

The heating of the assembled parts can conveniently be effected by an acetylene torch, the heating and welding being carried on progressively until the weld is completed and it is advisable after assembling the parts to tack weld them together before the final heating and welding of the described parts.

In the drawings:

Figure 1 is a sectional elevation of a boiler head and shell prepared and assembled for forge welding by my process.

Figure 2 is a similar view of a modified and equivalent arrangement of the parts, and Figure 3 is a similar view of the parts after forge welding.

A is the boiler shell; B the head. In Fig. 1, the edge of head B is bevelled as shown at B' and the parts are assembled with the bevel B' overlying the portion a of the shell to which it is to be forge welded.

In Fig. 2, the edge of the shell A is bevelled as shown at A' and the parts are assembled so that this bevel extends over the unbevelled portion b of the head. The overhanging bevel in either case and the portion of the other plate to which it is to be welded are heated, as by a torch, to the required temperature and the heated portions forge welded together forming a welded joint as shown at C, Fig. 3.

Having now described my invention, what I claim as new and desire to secure by Letters Patent, is:

The method of forge welding a steel plate head to a steel plate shell, which consists in forming a bevelled edge on one of the parts to be welded together, then assembling the parts together in such manner that the greater part of the bevelled edge of one part will overlap without contacting with the portion of the other plate to which it is to be welded, then heating the bevelled edge and the underlying portion of the second plate to a welding heat without heating the body of the head and shell to a working temperature and then forge welding said heated parts together to form a unitary structure.

JOHN PETTY.